US009828256B2

(12) United States Patent
Ohara et al.

(10) Patent No.: US 9,828,256 B2
(45) Date of Patent: Nov. 28, 2017

(54) METHOD FOR PRODUCING HEMATITE FOR IRONMAKING

(71) Applicant: SUMITOMO METAL MINING CO., LTD., Tokyo (JP)

(72) Inventors: Go Ohara, Tokyo (JP); Hideki Sasaki, Tokyo (JP); Yasumasa Kan, Tokyo (JP); Masaki Imamura, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/777,561

(22) PCT Filed: Dec. 12, 2013

(86) PCT No.: PCT/JP2013/083378
§ 371 (c)(1),
(2) Date: Sep. 16, 2015

(87) PCT Pub. No.: WO2014/155855
PCT Pub. Date: Oct. 2, 2014

(65) Prior Publication Data
US 2016/0289084 A1    Oct. 6, 2016

(30) Foreign Application Priority Data

Mar. 26, 2013   (JP) ................. 2013-063905

(51) Int. Cl.
*C01G 49/00*   (2006.01)
*C01G 49/06*   (2006.01)
(Continued)

(52) U.S. Cl.
CPC ............. *C01G 49/06* (2013.01); *C22B 3/06* (2013.01); *C22B 3/44* (2013.01); *C22B 23/00* (2013.01); *Y02P 10/234* (2015.11)

(58) Field of Classification Search
CPC ... C22B 23/0415–23/0438; C22B 3/44; C22B 3/06; C01G 49/06
(Continued)

(56) References Cited

U.S. PATENT DOCUMENTS 6,171,564 B1    1/2001  Jones
2008/0271571 A1   11/2008  Liu et al.

FOREIGN PATENT DOCUMENTS

CA    2 678 724     3/2010
EP    1 731 622    12/2006
(Continued)

OTHER PUBLICATIONS

International Search Report, dated Apr. 1, 2014.
(Continued)

*Primary Examiner* — Steven Bos
(74) *Attorney, Agent, or Firm* — Gerald E. Hespos; Michael J. Porco; Matthew T. Hespos

(57) ABSTRACT

Provided is a method for producing hematite for ironmaking, capable of using a conventional Ca-based neutralizing agent and a base rock-derived neutralizing agent other than the Ca-based neutralizing agent. The method is performed by a process of adding a mineral acid and an oxidizing agent to an ore containing iron and a valuable metal and then leaching the valuable metal under high temperature and pressure, and includes (1) a high-pressure acid leaching step, (2) a preliminary neutralization step, (3) a first solid-liquid separation step, (4) a neutralization step, (5) a second neutralization step, (6) a third solid-liquid separation step, (7) a step of adding part of the Fe-enriched slurry as a seed crystal in the neutralization step (4), and (8) a second solid-liquid separation step.

3 Claims, 2 Drawing Sheets

(51) Int. Cl.
*C22B 3/44* (2006.01)
*C22B 23/00* (2006.01)
*C22B 3/06* (2006.01)

(58) Field of Classification Search
USPC .............................................. 423/150.1, 633
See application file for complete search history.

(56) References Cited

FOREIGN PATENT DOCUMENTS

| | | | |
|---|---|---|---|
| JP | 3-176081 | | 7/1991 |
| JP | 2004-225120 | | 8/2004 |
| JP | 2009-510258 | | 3/2009 |
| JP | 4294685 | | 4/2009 |
| JP | 2009-520661 | | 5/2009 |
| JP | 2010-95788 | | 4/2010 |
| JP | 2011-195920 | | 10/2011 |
| WO | 2005/098060 | | 10/2005 |
| WO | 2007/039663 | * | 4/2007 |
| WO | 2007/070973 | | 6/2007 |
| WO | 2013/140836 | | 9/2013 |
| WO | 2013/140837 | | 9/2013 |
| WO | 2013/140900 | | 9/2013 |

OTHER PUBLICATIONS

"High pressure acid leaching of a refactory lateritic nickel ore," S. Kaya. Y.A. Topkaya dated Sep. 1, 2011.
European Search Report dated Jan. 9, 2017.

\* cited by examiner

METHOD FOR PRODUCING HEMATITE FOR IRONMAKING

BACKGROUND

1. Field of the Invention

The present invention relates to a method for producing hematite for ironmaking, and more particularly, to a method for producing hematite for ironmaking in which a process of hydrometallurgical refining of a nickel oxide ore includes a plurality of solid-liquid separation processes, thereby making it possible to suppress mixing of a sulfur compound into a leach residue during an real operation.

2. Description of the Related Art

Nickel has been widely used as a raw material of stainless steel.

However, in accordance with the tendency of depletion of a sulfide ore that becomes a raw material of nickel, a technology of refining a low-grade oxide ore has been developed and has been into practical use.

Specifically, a producing process called "high pressure acid leach (HPAL)" has been put into practical use, in which process a nickel oxide ore such as limonite and saprolite is put into a pressurizing apparatus such as an autoclave in combination with a sulfuric acid solution, and nickel is leached under a high temperature of approximately 240° C. to 260° C. and a high pressure.

The nickel leached into a solution of the sulfuric acid is used as nickel metal or a nickel salt compound by adding a neutralizing agent to the nickel so as to neutralize a surplus acid, separating from a leach residue by solid-liquid separation, separating impurities to recover the leach residue as an intermediate raw material in the form of hydroxide or sulfide, and further refining the intermediate raw material.

In the preliminary neutralization process of neutralizing the surplus acid, adjustment of pH that is appropriate for the solid-liquid separation is performed, and then in a subsequent process, or the solid-liquid separation process, concentration of a solid content and solid-liquid separation are performed with a facility called Counter current decantation (CCD). Typically, in the CCD, a plurality of continuous stages of thickeners are used.

A liquid component (hereinafter, may be referred to as an overflow), which is obtained from the CCD, is returned to a neutralization process for adjustment of pH that is appropriate for a sulfurization process. The pH adjustment is performed to remove a fine solid content that occurs through precipitation. Then, the liquid component is transmitted to the sulfurization process, and the liquid component is subjected to a sulfurization treatment, thereby an intermediate raw material such as a mixed sulfide of nickel and cobalt is typically obtained.

In this regard, for example, JP 2004-225120 A discloses a technology in which a part of a solid content (hereinafter, may be referred to as an underflow), which is obtained in CCD, is added as a seed crystal for a neutralization process so as to promote generation of a fine precipitate. Actually, this technology has been effectively used for an improvement in real-operation efficiency.

Employing the producing process called high pressure acid leach (HPAL) makes it possible to leach nickel almost completely, for example, in the case of nickel oxide ore, even in a low-grade ore in which a target valuable metal to be recovered is contained in an amount of 1% by weight to 2% by weight (hereinafter, the grade will be expressed by "%").

In addition, the intermediate raw material is manufactured from a leachate, and thus a target metal is concentrated to the same extent as in a conventional raw material, and the target metal can be obtained through substantially the same refining method and refining process as in the conventional raw material.

Further, the HPAL process is applicable to not only the nickel oxide ore but also many kinds of ores such as a nickel sulfide ore, a copper sulfide ore, and a copper oxide ore.

Besides, a main component of the leach residue that is obtained by the HPAL process is an iron oxide in a type of hematite and the like, and approximately 50% of iron is contained in the leach residue. Production volume of the leach residue is approximately 50 times to 100 times as much as that of the intermediate raw material. The reason for this is that each of the nickel oxide ore or the copper sulfide ore of a raw material contains iron in an amount much more than that of nickel or copper.

The leach residue is generated at a high temperature, and is in a type of a chemically and environmentally stable oxide, but has no particular utility value in a current state, and has been thus scrapped and stored in a residue disposal yard.

Therefore, a broad residue disposal yard is necessary for scrap and storage of an enormous amount of the leach reside which is generated in accordance with the HPAL process operation.

In steel smelting, a method of charging iron ore containing iron oxide into a blast furnace along with a reductant such as coke, heating and melting the iron ore under a reducing atmosphere to obtain crude steel, and refining the crude steel in a converter to obtain desired steel has been used.

The iron oxide that is a raw material of the steel is a limited resource, and furthermore it is gradually hard to obtain high-quality iron ore required to maintain a quality of steel. Accordingly, a study has been made with respect to use of the leach residue as the iron ore.

However, the leach residue in the HPAL process cannot be directly used as a raw material for ironmaking. The reason is that the leach residue in the HPAL process contains vein stone or impurities, particularly sulfur, in addition to the iron oxide, and thus the leach residue is not appropriate for a raw material that is used in a conventional iron-making process in common. Specifically, this is because the sulfur grade is high.

Particularly, a grade of the sulfur in the iron oxide which can be used as a raw material for ironmaking is different depending on facility capacity, an amount of production, and the like in individual ironworks. Typically, it is necessary to suppress the sulfur content to less than 1%.

Typically, the leach residue contains approximately 5% to 8% of sulfur.

The majority of sulfur contained in the leach residue is derived from calcium sulfate (plaster) that is mixed in during nickel refining.

When neutralizing free sulfuric acid, which remains in a leach slurry obtained during high-pressure acid leaching (the free sulfuric acid is sulfuric acid that remains without reaction in the sulfuric acid that is excessively added for performing sufficient leaching in the HPAL process), a typical inexpensive calcium-based neutralizing agent, for example, limestone or slaked lime is added. Accordingly, when calcium contained in the neutralizing agent and the free sulfuric acid react with each other, the plaster is generated and is then mixed into the leach residue.

A part (approximately 1%) of sulfur that is contained in the leach residue is trapped inside particles of hematite produced.

Thus, it is assumed that it is preferable to use what forms a soluble salt as a neutralizing agent to be added, instead of what forms insoluble precipitate, such as limestone or slaked lime, after the neutralization.

Examples of the neutralizing agent that is appropriate for the use include sodium hydroxide, potassium hydroxide, magnesium hydroxide, magnesium oxide.

However, From reasons including that these neutralizing agents are expensive and a production amount thereof is small, these neutralizing agents are not appropriate for a process such as the HPAL process in which an enormous amount of neutralizing agent is consumed.

Accordingly, it has been inevitable to totally or partially use the calcium-based neutralizing agent that forms the insoluble sediment after neutralization, and it has been impossible to avoid mixing-in of sulfur. Accordingly, it has been difficult to use hematite obtained by processing the leach residue produced in the HPAL process as the raw material for ironmaking.

Meanwhile, there is also known a method of separating sulfur in jarosite by using a pressurizing apparatus such as an autoclave.

For example, JP 03-176081 A discloses a method that includes stirring a jarosite-containing residual and a zinc sulfide inclusion in an autoclave at least under oxygen partial pressure of 1000 kPa at a temperature of 130 to 170° C. along with a free sulfuric acid of 40 to 100 g/l, substantially dissolving iron and zinc fractions of a concentrate containing the residual and zinc sulfide, introducing the solution into a leach circulation passage for zinc electrolysis to settle iron in the form of hematite, and separating sulfur from the above solid, and supplying the residual for separate application.

However, this method has problems of requiring an expensive device such as an autoclave, increasing a facility cost, and having a problem even in the aspect of productivity.

Then, it has been considered to use magnesium oxide contained in the ore as the neutralizing agent.

For example, JP 2009-520661 A discloses a process of recovering magnesium oxide from a source of magnesium sulfate. The process includes the steps of: preparing a source of magnesium sulfate in a solution that is derived from part of a process associated with leaching of a metal-containing ore or concentrate; converting the magnesium sulfate in solution into solid magnesium sulfate; contacting the solid magnesium sulfate with elemental sulfur in a reducing atmosphere; and recovering the magnesium as magnesium oxide, and the sulfur as a sulfur dioxide gas.

Using this method makes it possible to reuse magnesium contained in the ore as a neutralizing agent, and to suppress calcium that is carried, thereby reducing calcium that is mixed into iron oxide in the residue.

However, in the method disclosed in JP 2009-520661 A, a large amount of heat is necessary to crystallize magnesium in the solution as magnesium sulfate, or to heat the obtained magnesium sulfate for conversion into a magnesium oxide, and thus it cannot be said that the method is economical.

In this regard, there has been suggested a method of using an oxide ore (limonite ore), in which the magnesium content is high, as the neutralizing agent.

For example, JP 4294685 B1 discloses a method of recovering nickel or cobalt from an oxide ore containing nickel or cobalt, and iron. The method includes the steps of: preparing a first oxide ore and a second oxide ore as the oxide ore, the second oxide having higher magnesium content than the first oxide ore; classifying the first oxide ore into a first small-particle-size oxide ore and a first large-particle-size oxide ore, and classifying the second oxide ore into a second small-particle-size oxide ore and a second large-particle-size oxide ore; leaching nickel or cobalt from the first large-particle-size oxide ore with sulfuric acid to obtain a sulfuric acid leachate containing nickel or cobalt, and a leach residue; mixing the sulfuric acid leachate containing the leach residue with the second large-particle-size oxide ore to react the sulfuric acid leachate with magnesium contained in the second large-particle size oxide ore for adjusting a pH, thereby obtaining a reaction solution containing nickel or cobalt, and a reaction residue containing iron; and neutralizing the reaction solution containing the reaction residue with a neutralizing agent to obtain a neutralization solution containing nickel or cobalt, and a neutralization residue containing iron.

When using this method, it is possible to use the nickel oxide ore as the neutralizing agent.

However, the cost and time for classification of the ore are significant. In addition, a large amount of vein stone components are contained in the leach residue, and thus the iron content is low. Accordingly, it cannot be said that the leach residue is an efficient raw material.

Accordingly, it has been difficult to substitute the total of the neutralizing agent that is used in the HPAL process with magnesium oxide.

In addition, a method of preventing sulfur from being mixed-in by substituting the neutralizing agent with magnesium oxide derived from a base rock only in the preliminary neutralization process of producing the leach residue is easily retrieved.

However, when using the technology of improving real-operation efficiency as is described in JP 2004-225120 A, with the conventional calcium-based neutralizing agent in the neutralization process, the residue in the neutralization process is returned to CCD, and thus it is difficult to avoid mixing of sulfur into the leach residue.

An object of the present invention is to provide a method for producing hematite for ironmaking which is capable of using a base rock-derived neutralizing agent other than a Ca-based neutralizing agent and a conventional Ca-based neutralizing agent during a real operation of refining hematite, which has such a low sulfur component as to be used as a raw material for ironmaking, from a leach residue containing iron oxide that is produced by an HPAL process.

SUMMARY

To solve the above-described problems, according to a first aspect of the present invention, there is provided a method for producing (high-purity) hematite for ironmaking by a process of adding a mineral acid and an oxidizing agent to an ore containing iron and a valuable metal, and then leaching the valuable metal under high temperature and pressure. The method is performed by the following steps (1) to (8):

(1) a high-pressure acid leaching step of adding a neutralizing agent to a leachate that is obtained under the high temperature and pressure to neutralize the leachate, thereby forming a leach slurry;

(2) a preliminary neutralization step of converting the leach slurry into a slurry after preliminary neutralization so that the slurry after preliminary neutralization is composed of a Ni-enriched slurry and an Fe-enriched slurry;

(3) a first solid-liquid separation step of solid-liquid separating the slurry after preliminary neutralization that is obtained in the preliminary neutralization step (2), into the Ni-enriched slurry and the Fe-enriched slurry with washing;

(4) a neutralization step of neutralizing the Ni-enriched slurry that is obtained in the first solid-liquid separation step (3), with a Ca-based neutralizing agent;

(5) a second neutralization step of neutralizing the Fe-enriched slurry that is obtained in the first solid-liquid separation step (3), with a non-Ca-based neutralizing agent;

(6) a third solid-liquid separation step of solid-liquid separating and washing the Fe-enriched slurry that is neutralized in the second neutralization step (5);

(7) a step of adding part of the Fe-enriched slurry that is obtained in the first solid-liquid separation step (3), as a seed crystal in the neutralization step (4) of neutralizing the Ni-enriched slurry; and (8) a second solid-liquid separation step of solid-liquid separating a precipitate that is obtained from the neutralization step (4) of neutralizing the Ni-enriched slurry, with washing.

According to a second aspect of the present invention, an amount of the Fe-enriched slurry that is added as the seed crystal in the step (7) according to the first aspect, is 50% by weight to 80% by weight with respect to the precipitate that is generated due to the neutralization in the neutralization step (4) in terms of a weight ratio.

According to third aspect of the present invention, the neutralizing agent that is added to the leachate in the steps (1) and (2) according to the first and second aspects is a base rock or magnesium hydroxide.

According to a fourth aspect of the present invention, the neutralizing agent used in the second neutralization step (5) according to the first to third aspects is sodium hydroxide or potassium hydroxide.

According to a fifth aspect of the present invention, the neutralizing agent used in the neutralization step (4) according to the first to fourth aspects is limestone or slaked lime.

According to a sixth aspect of the present invention, the ore containing iron and a valuable metal according to the first to fifth aspects is a nickel oxide ore.

According to a seventh aspect of the present invention, the method further includes the following process (9) subsequent to the third solid-liquid separation step (6) according to the first to sixth aspects:

(9) a step of adjusting a moisture content by removing moisture from solid hematite obtained in the step (6) to set a moisture content of the hematite after removal to 10% by weight to 17% by weight.

According to the method for producing hematite for ironmaking of the present invention, a base rock-derived and non-Ca-based neutralizing agent other than a conventional Ca-based neutralizing agent can be used during a real operation of refining hematite, which contains a less sulfur component to an extent capable of being used as a raw material for ironmaking, from a leach residue containing iron oxide that is produced in an HPAL process. Accordingly, the method has a very high industrial value.

DETAILED DESCRIPTION

The present invention provides a method of producing (high-purity) hematite for ironmaking by a production process of adding a mineral acid and an oxidizing agent to an ore containing iron and a valuable metal, and of leaching the valuable metal under a high temperature and a high pressure, and the method includes steps (1) to (8) described below.

(1) A high-pressure acid leaching step of adding a neutralizing agent to a leachate that is obtained under a high temperature and a high pressure, for neutralization of the leachate so as to form a leach slurry.

(2) A preliminary neutralization step of converting the leach slurry into a slurry after preliminary neutralization in which a Ni-enriched slurry and an Fe-enriched slurry are separated.

(3) A first solid-liquid separation step of solid-liquid separating, with washing, the slurry after preliminary neutralization that is obtained in the preliminary neutralization step (2) into the Ni-enriched slurry and the Fe-enriched slurry.

(4) A neutralization step of neutralizing the Ni-enriched slurry that is obtained in the first solid-liquid separation step (3), by using a Ca-based neutralizing agent.

(5) A second neutralization step of neutralizing the Fe-enriched slurry that is obtained in the first solid-liquid separation step (3), by using a non-Ca-based neutralizing agent.

(6) A third solid-liquid separation step of solid-liquid separating the Fe-enriched slurry that is neutralized in the second neutralization step (5), and washing the obtained a solid content.

(7) A step of adding part of the Fe-enriched slurry that is obtained in the first solid-liquid separation step (3), as a seed crystal in the neutralization step (4) of neutralizing the Ni-enriched slurry.

(8) A second solid-liquid separation step of solid-liquid separating, with washing, a precipitate that is obtained from the neutralization step (4) of neutralizing the Ni-enriched slurry.

Hereinafter, the present invention will be described in detail with reference to the accompanying drawings.

Figure 1:
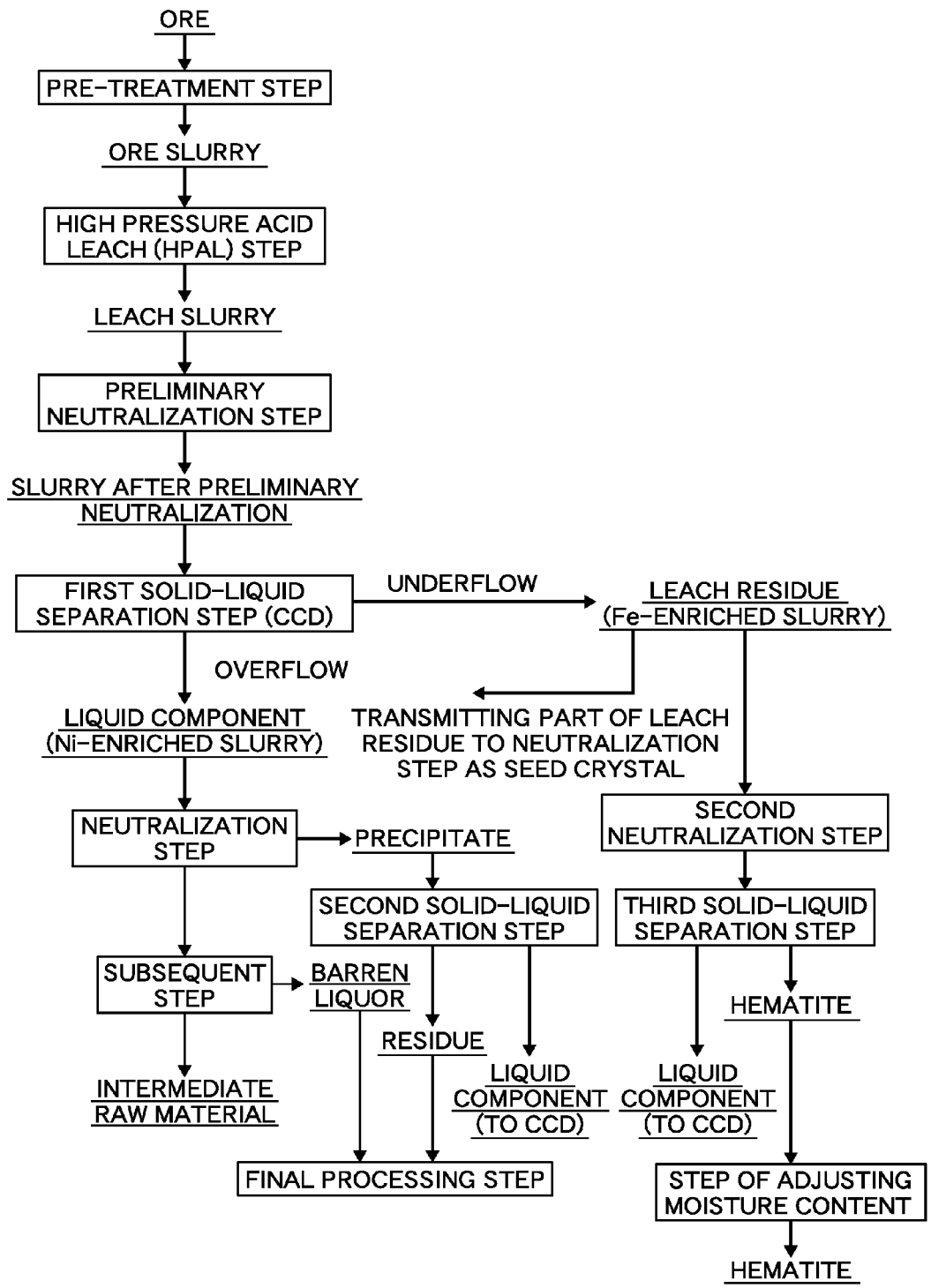
FIG. 1 is a producing process flow chart according to the present invention.

FIG. 1 is a producing process flow chart according to the present invention.

A valuable metal, which is contained in an ore, is manufactured according to a flow indicated by a solid-line arrow (fine solid-line arrow after a neutralization process) on a leftmost side in FIG. 1.

On the other hand, as indicated by a thick solid-line arrow in FIG. 1, hematite that is a by-product of the producing process is contained in a leach residue (Fe-enriched slurry) that is obtained at a branch destination indicated by a thick solid-line arrow branched to a right side from a first solid-liquid separation step (CCD), and is manufactured according to a flow indicated by a rightmost thick solid-line arrow in FIG. 1. Hereinafter, respective steps will be described in detail.

[Neutralization]

A neutralization process in the present invention is performed by three steps of "1. Preliminary Neutralization Step", "2. Neutralization Step", and "3. Second Neutralization Step". A neutralizing agent used in respective steps will be described below.

As a neutralizing agent used in the preliminary neutralization step, a base rock, magnesium oxide, or magnesium hydroxide is used.

As a neutralizing agent in the neutralization step, a Ca-based neutralizing agent can be used, and inexpensive limestone or slaked lime is used.

As a neutralizing agent in the second neutralization step, a non-Ca-based neutralizing agent is used, and sodium hydroxide or potassium hydroxide is used. However, magnesium hydroxide or magnesium oxide may be used.

Respective neutralization steps will be described.

1. Preliminary Neutralization Step

In the preliminary neutralization step of the present invention, first, a base rock (unit: % by weight), of which a representative component composition example is shown in Table 1, is used as a neutralizing agent to allow neutralization to progress while suppressing mixing-in of calcium. In the case of refining a nickel oxide ore, desired pH during the neutralization is approximately pH 1 to pH 3 so as to improve separation efficiency in the first solid-liquid separation step that is a subsequent step.

TABLE 1

|  | Ni | Fe | Co | Si | Mg | Cr | Al | Mn | Ca | S |
|---|---|---|---|---|---|---|---|---|---|---|
| Base rock | 0.22 | 4.92 | <0.02 | 17.4 | 22.1 | 0.26 | 0.13 | 0.09 | 0.08 | <0.05 |

2. Neutralization Step

In a neutralization step of neutralizing a liquid component (Ni-enriched slurry) that is obtained in the first solid-liquid separation step, a Ca-based neutralizing agent, such as inexpensive limestone and slaked lime, is used.

This makes it possible to stably perform an operation at the low cost. In the case of refining the nickel oxide ore, desired pH during the neutralization is approximately pH 3 to pH 5 so as to improve efficiency of impurity separation in a subsequent step.

A solid content that is neutralized and separated in this step is transmitted in a slurry state from a lower portion of the bottom of a neutralization bath to the second solid-liquid separation step. Since the solid content includes plaster as a main component, the solid content becomes a fine precipitate, and thus a settling velocity in the neutralization bath is slow. As a result, there is a problem in that a solid ratio of a settled precipitate does not sufficiently increase.

Here, to improve the settling velocity, it is preferable to add an Fe-enriched slurry (including hematite as a main component) of a leach residue, which is an underflow content in the first solid-liquid separation step (CCD), in an amount of 50% by weight to 80% by weight with respect to the weight of the precipitate in terms of solid content weight.

When the solid content weight is less than 50% by weight with respect to the weight of the precipitate, an improvement in the settling velocity is not sufficient. When the solid content weight is greater than 80% by weight, the effect of improving the settling velocity does not vary too much, and besides an amount of hematite that is produced by treating the Fe-enriched slurry decreases, and thus the above-described ranges are disadvantageous.

3. Second Neutralization Step

In the second neutralization step of neutralizing the leach residue (Fe-enriched slurry), it is preferable to use sodium hydroxide, potassium hydroxide, and the like, instead of magnesium hydroxide and the like whose supply is unstable.

Further, in the case of using the magnesium hydroxide as a neutralizing agent, an amount of Mg in discharged water increases, and thus a large amount of neutralizing agent is necessary for a final Mg solidification treatment. Accordingly, this case is not preferable.

Desired pH during the neutralization is approximately pH 6 to pH 8 in consideration of a final neutralization process of hematite.

[Solid-Liquid Separation]

Next, a solid-liquid separation treatment in the present invention is performed by three steps of "a first solid-liquid separation step", "a second solid-liquid separation step", and "a third solid-liquid separation step".

1. First Solid-Liquid Separation Step

The first solid-liquid separation step is performed by a known method such as counter current decantation (CCD), and the slurry after the preliminary neutralization that is neutralized by the preliminary neutralization step, is separated into a Ni-enriched slurry (liquid component) and an Fe-enriched slurry (solid component: leach residue).

Here, the Ni-enriched slurry is an overflow liquid (supernatant liquid) that is obtained from CCD, and a slight amount of solid content is mixed therein, and is thus referred to as slurry for convenience.

The Ni-enriched slurry is processed in a subsequent process, and becomes an intermediate raw material such as nickel-cobalt mixed sulfide and nickel sulfate solution, and is further refined to be a valuable metal.

On the other hand, the leach residue of the Fe-enriched slurry is treated by the second neutralization step and the third solid-liquid separation step along a flow indicated by a rightmost solid-line arrow in FIG. 1, and at a result, iron oxide (high-purity hematite) for ironmaking is recovered.

2. Second Solid-Liquid Separation Step

The second solid-liquid separation step is performed by using a known method such as the counter current decantation (CCD) to recover a liquid component from slurry of a precipitate, which is obtained from the neutralization step and contains plaster as a main component, as a washing liquid used in the first solid-liquid separation step (CCD), and a residue is transmitted to a final processing step.

This second solid-liquid separation step makes it possible to prevent plaster from mixing into the Fe-enriched slurry and to suppress the sulfur content in hematite obtained.

3. Third Solid-Liquid Separation Step

The third solid-liquid separation step is performed by using a known method, such as wet-classification, a thickener, and filter pressing, to recover hematite having sulfur content of less than 1%, as a solid content from the Fe-enriched slurry after neutralization which is obtained from the second neutralization step. In addition, a liquid component that is obtained is recovered as a washing liquid used in the first solid-liquid separation step (CCD).

In the case of performing neutralization of a surplus acid contained in the leach slurry by using a base rock, it is preferable that after the leach slurry is treated by the first solid-liquid separation step, the resultant leach residue (hereafter, referred to as "neutralized residue" for distinction) be classified (wet-classification) by using a wet cyclone and the like so that hematite be concentrated on a small particle size side of the neutralized residue (O/F side of the wet cyclone) and materials other than hematite be concentrated on a large particle size side (U/F side of the wet cyclone), thereby increasing the grade of hematite.

Figure 2:
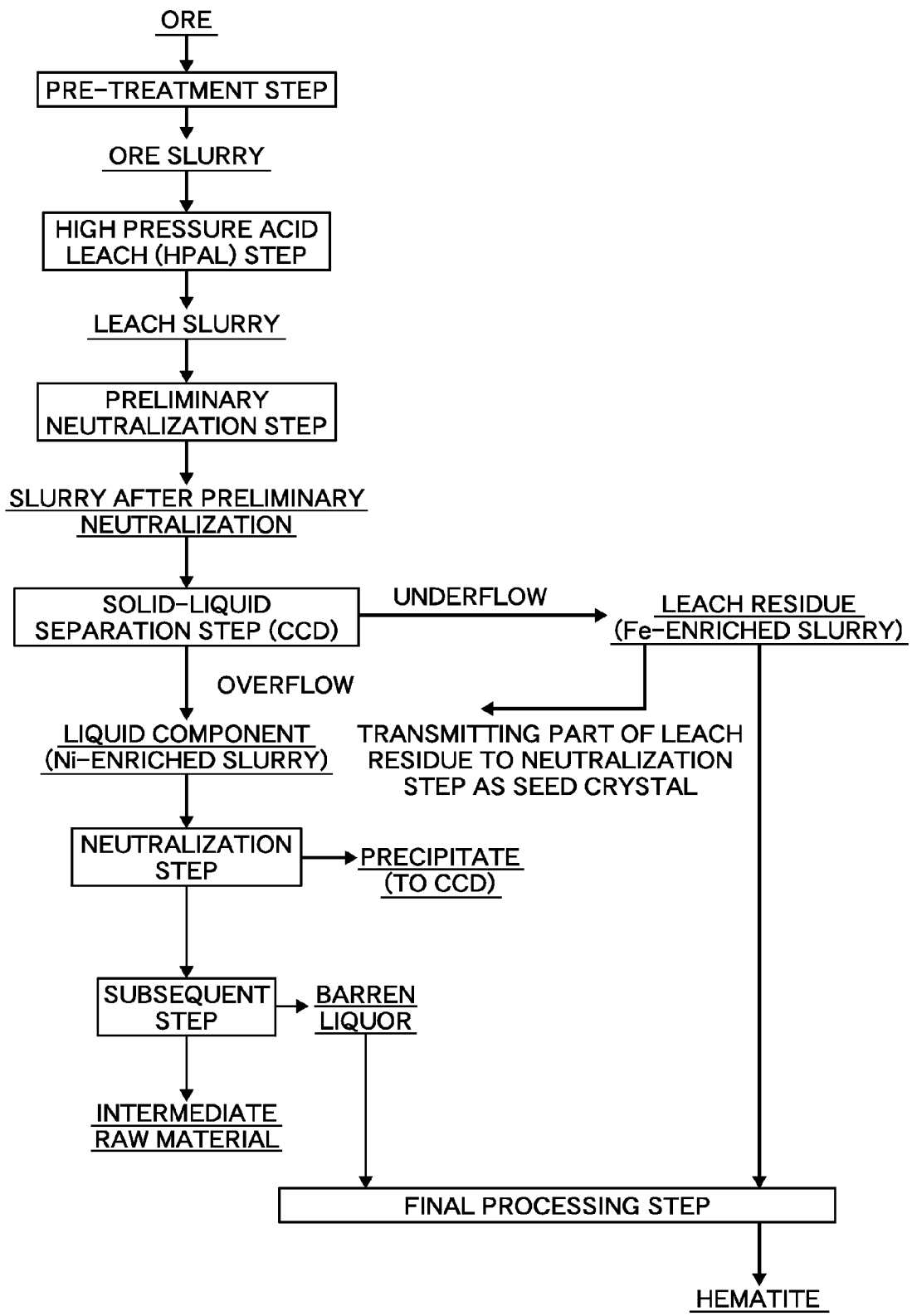
FIG. 2 is a conventional producing process flow chart.

As described above, in a case where the Fe-enriched slurry is added in the neutralization step, and a precipitate that is a residue generated in the neutralization step is returned to CCD in order to improve operation efficiency during a real operation (refer to a flow chart of a conventional producing process shown in FIG. 2), hematite that contains sulfur in an amount of approximately 5% to 8% is obtained. However, when the present invention is applied, it is possible to obtain hematite in which the sulfur content is less than 1%.

On the other hand, in a hematite cake (described as "hematite" in FIG. 1) that is obtained by the third solid-liquid separation step in the producing method of the present invention, the sulfur content is as low as less than 1%, but the moisture content is as relatively high as 22%.

Typically, during transportation of a solid material, if the moisture content is high, a liquefaction phenomenon occurs during transportation by ship, and thus there is a possibility that the ship is overturned. From an investigation made by Japan Marine Surveyors and Sworn Measurers' Association, it is found that a transportable moisture limit (TML) of hematite of the present invention is 17% or less. Accordingly, in the case of the transportation by ship, it is necessary to decrease the moisture content of the hematite cake. In addition, a particle size of hematite is as very small as approximately 1 μm, and thus a possibility of dust generation is extremely high. As the moisture content increases, the dust generation further decreases.

As the moisture content decreases from 17%, and reaches approximately 10%, fine particles tend to significantly increase, and thus the moisture content is preferably 10% to 17%. In a case where dust prevention is possible by using a flexible container and the like during handling, it is preferable that the moisture content be further lower.

In this regard, a step for adjusting moisture content may be performed to control the moisture content. In the present invention, dehydration is performed to remove the moisture content from the hematite cake.

Examples of the dehydration include a heating, a filter pressing, and a centrifugal separation, and the filter pressing (pressure filtration) has been widely used in consideration of high moisture removing efficiency and economic efficiency.

In addition, it is preferable that a particle size of the base rock to be used in the preliminary neutralization process be adjusted to an optimal size range through pulverization and the like.

Specifically, in a case where the particle size of the base rock is in a range not exceeding 500 μm, there is a little difference in a neutralization performance. In addition, in the case of using a wet cyclone for classification, the greater a particle size of a material to be classified and removed is, the further classification accuracy can increase. Accordingly, when the particle size of the base rock is adjusted to an average particle size in a range of 500 μm or less, and preferably approximately 150 μm in consideration of a facility load, gangue and the like other than hematite is distributed toward the U/F side, and as a result, it is possible to improve the grade of hematite.

In addition, it is preferable to granulate the hematite for ironmaking, which is manufactured by the above-described producing method, to obtain a granulated material.

In the hematite cake that is obtained in the process, the following problems may occur: (1) the shape of the hematite cake may be not uniform; (2) dusting may occur; and (3) since flowability may deteriorate, there is a high possibility that (a) in a case where the hematite cake is mixed with other iron ores by an iron-producing maker, it causes a non-uniform mixed state, (b) charging efficiency deteriorate due to the poor flowability, or (c) dusting tends to occur.

Accordingly, when a granulated material having a uniform particle size is obtained by performing the granulation, the above-described problems are solved. As a granulation method, rolling granulation, compression granulation, and extrusion granulation are widely known. Granulating the hematite by these granulation methods makes it possible to obtain a uniform granulated material having good flowability, is obtained. Besides, occurrence of dusting further decreases in comparison with the hematite cake.

Further, the hematite produced for ironmaking is preferably subjected to a heating treatment at 600° C. to 1400° C. in consideration of a reduction of the sulfur content.

For the majority of sulfur that still remains even though the present invention is applied, it is considered as sulfur in a sulfur component incorporated into hematite particles during the high-temperature pressure acid leaching process, not as sulfur derived from plaster. Accordingly, when applying the present invention, it is possible to substantially remove the entirety of sulfur derived from plaster.

Hereinafter, the present invention will be described in more detail with reference to Examples and Comparative Examples. The common conditions in Examples and Comparative Examples were set as follows.

Raw material ore: a nickel oxide ore having 1% nickel grade and 46% to 48% iron grade.
Ore slurry: subjected to a pre-treatment to obtain a slurry of 30% by weight to 40% by weight.
High-pressure acid leaching: a slurry mixed with 98% by weight of sulfuric acid was charged into a pressure device, heated to 240° C. to 250° C., and maintained for one hour, and nickel in the ore was then leached.
Neutralizing agent used in a preliminary neutralization step: base rock (<approximately 300 μm to 400 μm).
Neutralizing agent used in a neutralization step: slaked lime.
Amount of Fe-enriched slurry added in the neutralization step: 70% of an amount of a precipitate which occurs.

Moisture content was measured by a heat drying type moisture meter "ML-50" manufactured by A&D Company, Limited, and sulfur grade was measured by using carbon and sulfur analyzer.

Example 1

The second solid-liquid separation step (CCD), the third solid-liquid separation step (filter pressing), and the second neutralization step (neutralizing agent: sodium hydroxide) were performed in accordance with a producing process flow of the present invention as shown in FIG. 1. Particularly, the operation was performed without returning a precipitate obtained from the neutralization step to the first solid-liquid separation step.

As a result, the sulfur grade of hematite obtained was 0.9%, and thus hematite capable of being used as a raw material for ironmaking could be obtained.

The Fe-enriched slurry was added to the neutralization step to promote settlement of a precipitate, and thus the operation could be performed at the same efficiency as in the conventional art.

Example 2

The second solid-liquid separation step (CCD), the third solid-liquid separation step (filter pressing), and the second neutralization step (neutralizing agent: sodium hydroxide) were performed in accordance with the producing process flow of the present invention as shown in FIG. 1. Particularly, the operation was performed without returning a precipitate obtained from the neutralization step to the first solid-liquid separation step.

The resultant hematite cake was subjected to high-pressure filter pressing (with a high-pressure heating filtration apparatus), thereby obtaining hematite having 0.9% sulfur grade and 13% of moisture content.

Example 3

The second solid-liquid separation step (CCD), the third solid-liquid separation step (filter pressing), and the second neutralization step (neutralizing agent: sodium hydroxide) were performed in accordance with the producing process flow of the present invention as shown in FIG. 1. Particularly, the operation was performed without returning a precipitate obtained from the neutralization step to the first solid-liquid separation step.

The resultant hematite cake was subjected to a high-pressure filter pressing (with a high-pressure heating filtration apparatus) and extrusion granulation, thereby obtaining a hematite granulated material having a diameter of 1 mm.

The sulfur grade was 0.9% and the moisture content was 13%.

Example 4

The second solid-liquid separation step (CCD), the third solid-liquid separation step (filter pressing), and the second neutralization step (neutralizing agent: sodium hydroxide) were performed in accordance with the producing process flow of the present invention as shown in FIG. 1. Particularly, the operation was performed without returning a precipitate obtained from the neutralization step to the first solid-liquid separation step.

The resultant hematite cake was subjected to high-pressure filter pressing (with a high-pressure heating filtration apparatus), thereby obtaining hematite having 0.9% sulfur grade and 13% of moisture content.

This obtained cake was subjected to a heating treatment at 1400° C., thereby obtaining a hematite granulated material having 0% of moisture content and 0.05% of sulfur concentration.

Comparative Example 1

In accordance with the conventional producing process flow chart as shown in FIG. 2, without applying the present invention, a precipitate obtained in a neutralization step was returned to CCD (a first solid-liquid separation step).

As a result, the sulfur content of hematite obtained was 6.5%, thereby only obtaining hematite not capable of being used as a raw material for ironmaking.

In the hematite in a powder form that is obtained according to the present invention, approximately 1% by weight of sulfur remains. However, when applying the known methods described below in combination, there is a possibility that the hematite can be used as a more satisfactory raw material for ironmaking.

Specifically, when applying a method of removing sulfur that remains in hematite by drying and baking a supply material to remove sulfur and crystal hydration water that are contained in the supply material as described in JP 2012-5175223 T, and then applying a method of briquetting an iron raw material in a powder form, for example, as disclosed in JP 2004-269960 A or a method of pelleting an iron raw material in a powder form as described in JP 2006-233220 A, in combination, it is possible to expect a more favorable raw material for ironmaking.

In addition, it is possible to remove sulfur from hematite particles as SOX by roasting the hematite obtained at a predetermined temperature.

Specifically, it is possible to obtain hematite having a sulfur concentration of 0.5% or less by performing heat treatment at 600° C. or higher. When the heat treatment is performed at a temperature higher than 1400° C., a sulfur concentration becomes 0.05% or less, which concentration is the same as that of a conventional iron ore. Although hematite with a low sulfur concentration can be obtained through a heat treatment at a temperature higher than 1400° C., with such a high heat treatment temperature, an increase of energy consumption and a shortening of operational lifespan of a furnace wall material occur, and thus performing a heat treatment at 1400° C. or lower is economically preferable.

The invention claimed is:

1. A method of producing hematite for ironmaking, the method comprising:
    a high-pressure acid leaching step of mixing an ore slurry with a mineral acid and leaching under a high temperature and pressure to form a leach slurry;
    a preliminary neutralization step of adding a base rock or magnesium hydroxide to the leach slurry;
    a first separation step of separating the leach slurry after preliminary neutralization into a Ni-enriched slurry and an Fe-enriched slurry;
    a first neutralization step of neutralizing the Ni-enriched slurry with limestone or slaked lime, the first neutralization step including adding to the Ni-enriched slurry an amount of the Fe-enriched slurry as a seed crystal;
    a second separation step of solid liquid separating a precipitate that is obtained from the first neutralization step of neutralizing the Ni-enriched slurry;
    a second neutralization step of neutralizing the Fe-enriched slurry obtained in the first separation step with sodium hydroxide or potassium hydroxide; and
    a third separation step of separating the Fe-enriched slurry that is neutralized in the second neutralization step into hematite and a liquid component.

2. The method of producing hematite for ironmaking according to claim 1, wherein the amount of the Fe-enriched slurry added as the seed crystal in the first neutralization step is 50% by weight to 80% by weight with respect to the precipitate that is generated due to the neutralization in terms of a weight ratio.

3. The method of producing hematite for ironmaking according to claim 1, further comprising:
    adjusting a moisture content of the hematite obtained in the third separation step to provide a hematite with a moisture content of 10% by weight to 17% by weight, the step of adjusting the moisture content being carried out subsequent to the third separation step.

* * * * *